W. T. YARD.
SPRAYING NOZZLE.
APPLICATION FILED AUG. 14, 1906.
912,520.
Patented Feb. 16, 1909.
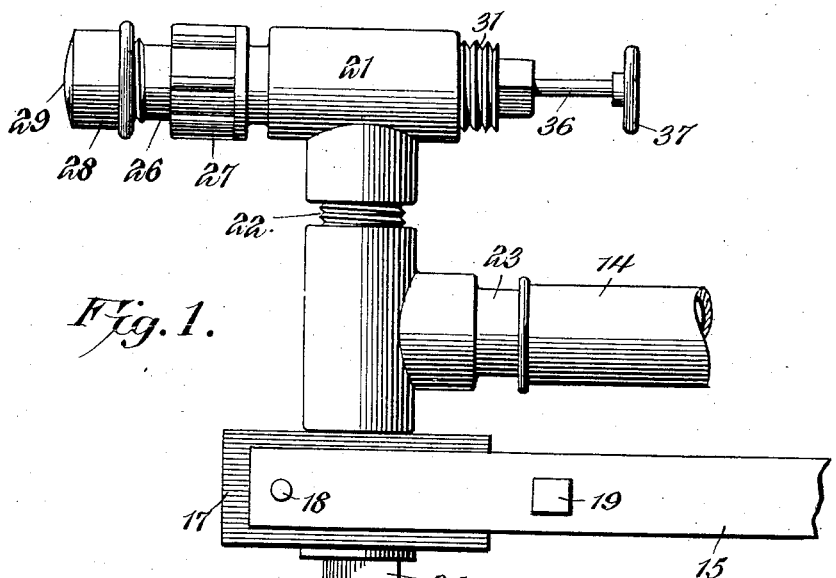
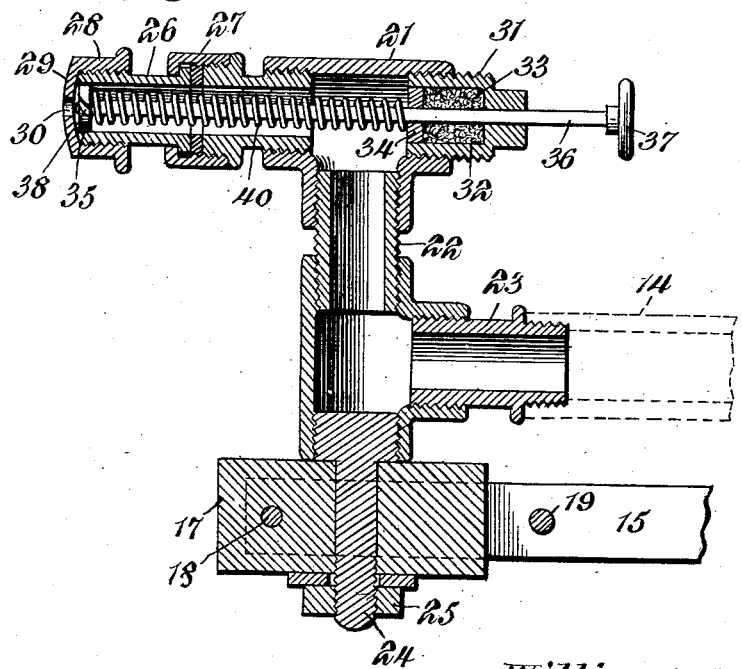
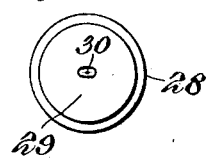
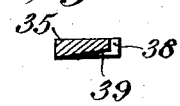
William T. Yard, Inventor,
Witnesses

UNITED STATES PATENT OFFICE.

WILLIAM T. YARD, OF TRENTON, NEW JERSEY.

SPRAYING-NOZZLE.

No. 912,520.

Specification of Letters Patent.

Patented Feb. 16, 1909.

Application filed August 14, 1906. Serial No. 330,607.

*To all whom it may concern:*

Be it known that I, WILLIAM T. YARD, a citizen of the United States, residing at Trenton, in the county of Mercer and State of New Jersey, have invented a new and useful Spraying-Nozzle, of which the following is a specification.

This invention relates to spraying nozzles, and may be employed for delivering insecticides, white wash, and like substances, being applicable to a vehicle, or manually manipulated, as found convenient or necessary.

One of the principal objects is to provide a nozzle that will produce a finely divided even spray, and will distribute the same over a comparatively great area.

Another and important object is to provide a novel structure, which can be quickly freed from the accumulation of solid material, should it become clogged therewith, without the necessity of dismembering the nozzle.

The preferred form of construction is illustrated in the accompanying drawings, wherein:—

Figure 1 is a side elevation of the structure. Fig. 2 is a vertical sectional view through the same. Fig. 3 is a front elevation of the nozzle. Fig. 4 is a view in elevation of the plunger. Fig. 5 is a detail sectional view through the plunger on the line 7—7 of Fig. 4.

Similar reference numerals designate corresponding parts in all the figures of the drawings.

While in the present embodiment, the invention is to be applied to a distributer mounted on a vehicle, and is intended for spraying potato vines, small fruit bushes, and the like, it will be apparent that the structure may be hand directed.

The spraying nozzle is designated as a whole, by the reference numeral 13. Said nozzle is connected to the usual pump by a flexible pipe 14. The support for the nozzle is in the form of a bracket 15, having a block 17 pivoted, as shown at 18 between the arms thereof. A clamping bolt 19 connects said arms of the bracket in rear of the block 17, and has a thumb screw 20, threaded upon one end. So far as thus described, the structure is substantially the same as that disclosed in a former patent granted to me on January 24, 1905, and numbered 780,928.

The nozzle in the present case, consists of a casing 21, carried by a tubular standard 22 that constitutes an inlet to the casing, and has an offset nipple 23, connected to the supply pipe 14. The lower end of the standard has a shank 24 passing through the block 17, and held in place by a nut 25, threaded on its lower end. The rear end of the casing 21 consists of a section 26 having a suitable connection 27 with the main body of the casing, and on the rear end of the section 26 is screwed a cap 28, provided with an outwardly dished end wall 29 having a central and slightly elongated opening 30 therethrough. A stuffing box in the form of a plug 31 is threaded into the opposite end of the casing 21, and is provided in its inner end with a socket 32 to receive packing 33. A packing washer 34 closes the inner end of the socket 32.

Rotatably and slidably mounted within the casing is a plunger disk 35, secured to the inner end of a stem 36 that passes longitudinally through the casing, through the packing washer 34, and the stuffing box 31, its outer end having a suitable actuating knob 37. The plunger disk 35 is provided in its periphery with diagonal liquid-conducting channels 38, and its outer face, which is disposed in opposition to the discharge orifice 30, has slots or grooves 39 communicating at their outer and deeper ends with the channels 38, said grooves 39 gradually decreasing in depth and being disposed tangentially to the adjacent end of the stem 36, as fully illustrated in Figs. 4 and 5. A coiled spring 40 is located on the stem, one end bearing against the packing washer 34, and the other against the plunger disk 35.

In using the device, the material to be sprayed is forced through the standard 22, and thence in to the casing, passing through the diagonal grooves of the plunger, and out of the discharge orifice. It will be observed by reference to Fig. 2 that the plunger is held by the spring against the marginal portions of the end wall 29. The said wall, being dished or concaved, a chamber is formed between it and said plunger. The liquid passing through the inclined or diagonal groove 38, will be given a whirling motion, and experience has demonstrated that, as a result, a finely divided even spray is produced by the nozzle. If the channels become clogged with solid or undissolved material, the plunger can be readily revolved or reciprocated by operating the handle 37, and thus the structure may be freed from the accumulations. The spring, as shown, performs a double function. In the first place, it maintains the plunger in operative position at the discharge end of the casing, and furthermore, inasmuch as it bears against the washer 34, it will insure the proper engagement of the packing with the stem and avoid all leakage at the stuffing box. The structure moreover is exceedingly simple, as will be apparent, and can be readily and cheaply manufactured.

From the foregoing, it is thought that the construction, operation, and many advantages of the herein described invention, will be apparent to those skilled in the art, without further description, and it will be understood that various changes in the size, shape, proportion, and minor details of construction, may be resorted to without departing from the spirit or sacrificing any of the advantages of the invention.

Having thus fully described my invention, what I claim as new, and desire to secure by Letters Patent, is:—

1. In a spraying nozzle of the character set forth, the combination with a casing having a discharge orifice, of a plunger located in the casing and having a flat face opposed to the orifice, said plunger having liquid conducting channels extending therethrough, and inwardly tapered grooves in the flat face that is opposed to the discharge orifice, said grooves communicating at their outer ends with the channels and being disposed in substantially parallel relation and tangentially to the longitudinal axis of the plunger.

2. In a spraying nozzle of the character set forth, the combination with a tubular casing having an inlet opening between its ends, an outwardly dished end wall provided with a central discharge orifice and a plug threaded into the opposite end of the casing to said dished end wall and having a packing-receiving socket in its inner end of less diameter than the same, of a reciprocatory plunger slidably mounted in the casing and movable toward and from the orifice, said plunger having diagonally disposed liquid conducting channels through its margin, a stem connected to the plunger and slidably extending through the plug and socket, packing located in the socket, a washer arranged in the inner end of said socket against the packing and mounted on the stem, and a coiled spring surrounding the stem, said spring being interposed between and bearing at its opposite ends against the plunger and washer.

In testimony, that I claim the foregoing as my own, I have hereto affixed my signature in the presence of two witnesses.

WILLIAM T. YARD.

Witnesses:
   Ignatius Le Jambre,
   Linton Satterthwait.